US012646506B2

(12) United States Patent
Miller-Smith et al.

(10) Patent No.: US 12,646,506 B2
(45) Date of Patent: Jun. 2, 2026

(54) DYNAMIC CHAPTER GENERATION FOR A COMMUNICATION SESSION USING AN OVERALL SCORE AND A CHAPTER SCORE

(71) Applicant: Zoom Communications, Inc., San Jose, CA (US)

(72) Inventors: Andrew Miller-Smith, Chicago, IL (US); Ling Tsou, Los Angeles, CA (US); Tong Wang, Lexington, MA (US)

(73) Assignee: Zoom Communications, Inc., San Jose, CA (US)

( * ) Notice: Subject to any disclaimer, the term of this patent is extended or adjusted under 35 U.S.C. 154(b) by 769 days.

(21) Appl. No.: 17/719,309

(22) Filed: Apr. 12, 2022

(65) Prior Publication Data

US 2023/0326454 A1 Oct. 12, 2023

(51) Int. Cl.
*G10L 15/18* (2013.01)
*G06F 40/289* (2020.01)
(Continued)

(52) U.S. Cl.
CPC ........ *G10L 15/1815* (2013.01); *G06F 40/295* (2020.01); *G06F 40/30* (2020.01);
(Continued)

(58) Field of Classification Search
CPC ........ G10L 17/02; H04L 12/1822; G06N 3/08
See application file for complete search history.

(56) References Cited

U.S. PATENT DOCUMENTS

| | | | | |
|---|---|---|---|---|
| 11,423,911 B1 * | 8/2022 | Fu | ........................ | G10L 17/02 |
| 11,709,989 B1 * | 7/2023 | Mohammed | ............ | G06N 3/08 |
| | | | | 706/20 |

(Continued)

FOREIGN PATENT DOCUMENTS

| | | | | | |
|---|---|---|---|---|---|
| CA | 3153868 A1 * | 3/2022 | ............. | G06F 40/35 |
| CN | 110931013 A * | 3/2020 | ............. | G10L 15/02 |

OTHER PUBLICATIONS

International Search Report and Written Opinion mailed on Jun. 16, 2023 in corresponding PCT Application No. PCT/US2023/018132.

*Primary Examiner* — Farzad Kazeminezhad
(74) *Attorney, Agent, or Firm* — Young Basile Hanlon & MacFarlane, P.C.

(57) ABSTRACT

Methods and systems provide for providing dynamic chapter generation for a communication session. In one embodiment, the system connects to a communication session with a number of participants; receives a transcript of a conversation between the participants produced during the communication session, the transcript including timestamps for a number of utterances associated with speaking participants; segments the utterances into a plurality of contiguous topic segments; generates a title for each topic segment, the generating comprising: labeling one or more of the topic segments based on one or more labeling rules, extracting one or more top phrases from each topic segment, determining a ranking of the top phrases for each topic segment, and generating the title for each topic segment based on the top ranked phrase for the topic segment; and transmits, to one or more client devices, a list of the topic segments with generated titles for the communication session.

20 Claims, 9 Drawing Sheets

(51) Int. Cl.

| | |
|---|---|
| *G06F 40/295* | (2020.01) |
| *G06F 40/30* | (2020.01) |
| *G06F 40/35* | (2020.01) |
| *G06N 3/08* | (2023.01) |
| *G06Q 50/18* | (2012.01) |
| *G10L 15/02* | (2006.01) |
| *G10L 15/04* | (2013.01) |
| *G10L 15/22* | (2006.01) |
| *G10L 15/28* | (2013.01) |
| *G10L 15/30* | (2013.01) |
| *G10L 17/02* | (2013.01) |
| *H04L 12/18* | (2006.01) |
| *H04L 65/403* | (2022.01) |

(52) U.S. Cl.

CPC .............. *G10L 15/04* (2013.01); *G10L 15/22* (2013.01); *G10L 15/30* (2013.01); *H04L 65/403* (2013.01)

(56) References Cited

U.S. PATENT DOCUMENTS

| | | | | |
|---|---|---|---|---|
| 2020/0243094 | A1* | 7/2020 | Thomson ................ | G10L 15/28 |
| 2020/0380964 | A1* | 12/2020 | Kang ...................... | G06F 40/35 |
| 2021/0383127 | A1 | 12/2021 | Kikin-Gil et al. | |
| 2022/0353101 | A1* | 11/2022 | Hu ....................... | H04L 12/1822 |
| 2023/0289527 | A1* | 9/2023 | Booth ................... | G06Q 50/18 |

* cited by examiner

CONNECT TO COMMUNICATION SESSION    210

RECEIVE TRANSCRIPT OF CONVERSATION BETWEEN PARTICIPANTS, INCLUDING UTTERANCES FOR PARTICIPANTS    220

SEGMENT UTTERANCES INTO CONTIGUOUS TOPIC SEGMENTS    230

GENERATE TITLE FOR EACH TOPIC SEGMENT    240

TRANSMIT A LIST OF THE TOPIC SEGMENTS WITH GENERATED TITLES TO CLIENT DEVICE(S)    250

GENERATING A TITLE FOR EACH TOPIC SEGMENT

EXTRACT ENTITY NAMES AND ENTITY LABELS FROM TOPIC SEGMENTS — 241

LABEL TOPIC SEGMENTS BASED ON LABELING RULES — 242

EXTRACT TOP PHRASES FROM EACH TOPIC SEGMENT — 244

DETERMINE RANKING OF THE TOP PHRASES FOR EACH TOPIC SEGMENT — 246

GENERATE TITLE FOR EACH TOPIC SEGMENT BASED ON THE TOP RANKED PHRASE — 248

Greeting
Break
Customer Info
Product
Demo
Pricing/License
Account
General Discussion
Closing

FIG. 5

DYNAMIC CHAPTER GENERATION FOR A COMMUNICATION SESSION USING AN OVERALL SCORE AND A CHAPTER SCORE

FIELD OF INVENTION

The present invention relates generally to digital communication, and more particularly, to systems and methods for providing dynamic chapter generation for a communication session.

SUMMARY

The appended claims may serve as a summary of this application.

BRIEF DESCRIPTION OF THE DRAWINGS

The present invention relates generally to digital communication, and more particularly, to systems and methods providing for providing dynamic chapter generation for a communication session.

The present disclosure will become better understood from the detailed description and the drawings, wherein:

FIG. 5 is a diagram illustrating examples of chapter titles for topic segments.

DETAILED DESCRIPTION

Figure 1A:
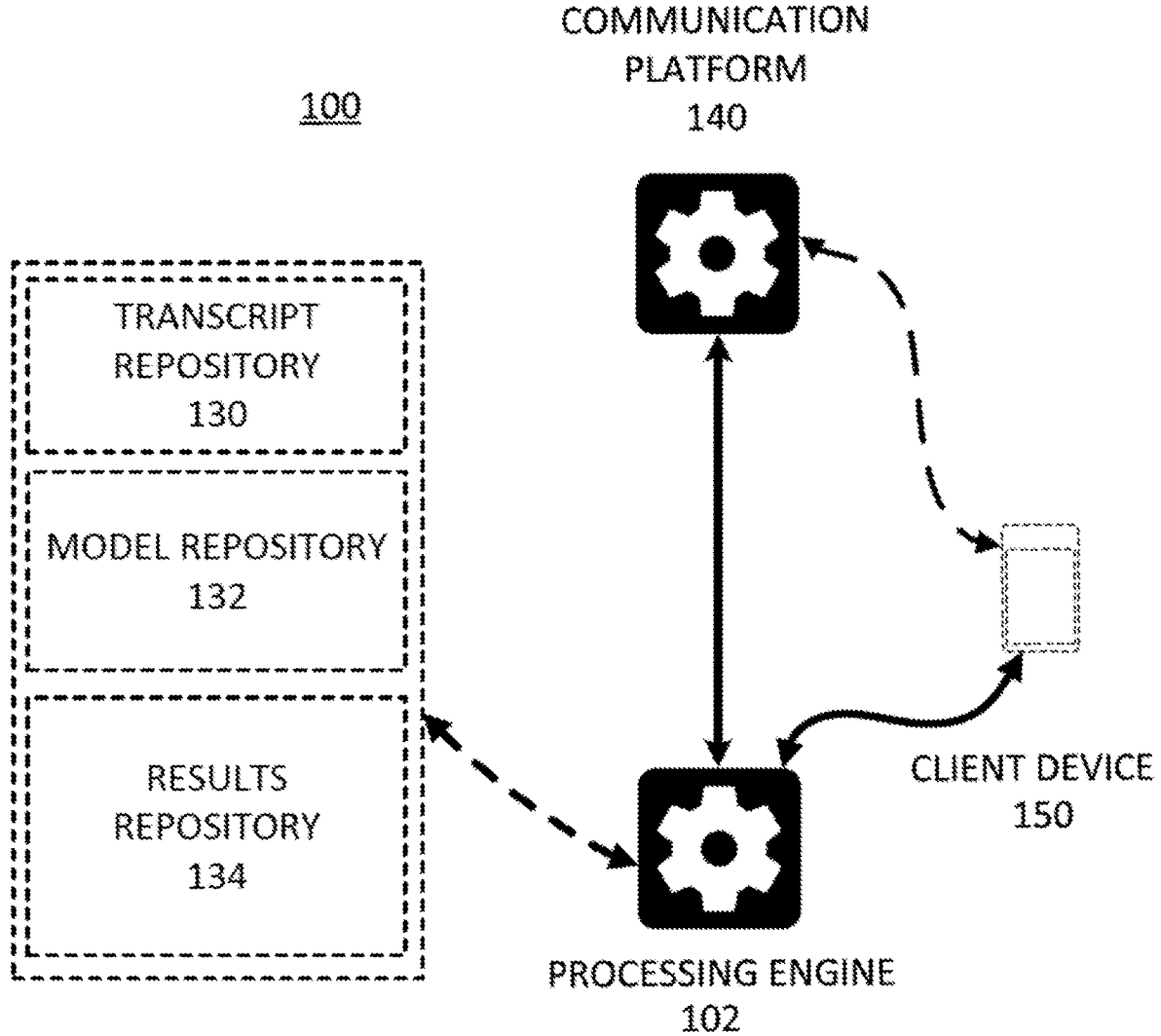
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

Particularly, when navigating through recorded video of a communication session, reviewing a sales meeting can be difficult and time consuming, as sales meeting can often run for 30-60 minutes, and a large amount of time is often spent on scrolling through the meeting to find the portion or topic the user is looking for. Additionally, past sales meetings can be difficult to search for, as there is no way to search for specific topics of discussion for specific prospective customers.

Thus, there is a need in the field of digital communication tools and platforms to create a new and useful system and method for providing dynamic chapter generation for a communication session. The source of the problem, as discovered by the inventors, is a lack of ability to dynamically segment a meeting into chapters based on the content of the meeting, and a lack of ability to dynamically generate titles for those chapters based on the top phrases used therein.

In one embodiment, the system connects to a communication session with a number of participants; receives a transcript of a conversation between the participants produced during the communication session, the transcript including timestamps for a number of utterances associated with speaking participants; segments the utterances into a plurality of contiguous topic segments; generates a title for each topic segment, the generating comprising: labeling one or more of the topic segments based on one or more labeling rules, extracting one or more top phrases from each topic segment, determining a ranking of the top phrases for each topic segment, and generating the title for each topic segment based on the top ranked phrase for the topic segment; and transmits, to one or more client devices, a list of the topic segments with generated titles for the communication session.

A meeting, such as a communication session facilitated via a remote communication platform, typically contains several topics or different aspects. A system for dynamic chapter generation, in accordance with some embodiments, functions to automatically segment a communication session based on the content of the session and topics, then automatically generates a title for each segment.

In some embodiments, at least one input for the system is a meeting transcript which contains a list of utterances with timing and speaker information. In some embodiments, at least one output for the system includes a list of segments with generated title for each segment. In some embodiments, each segment in the list may additionally include one or more of a start time, end time, start utterance ID, and/or end utterance ID.

An exemplary method for the system includes two key components: topic segmentation, and title generation. Both of these components will be described in further detail below.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a transcript repository 130, model repository 132, and/or a results repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

In an embodiment, the processing engine 102 may perform the exemplary method of FIG. 2 or other method herein and, as a result, provide dynamic chapter generation for a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a transcript repository 130, model repository 132, and/or results repository 134. The optional repositories function to store and/or maintain, respectively, a transcript for the communication session; topic segmentation and title generation models; and topic segmentation and/or title generation results for the communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
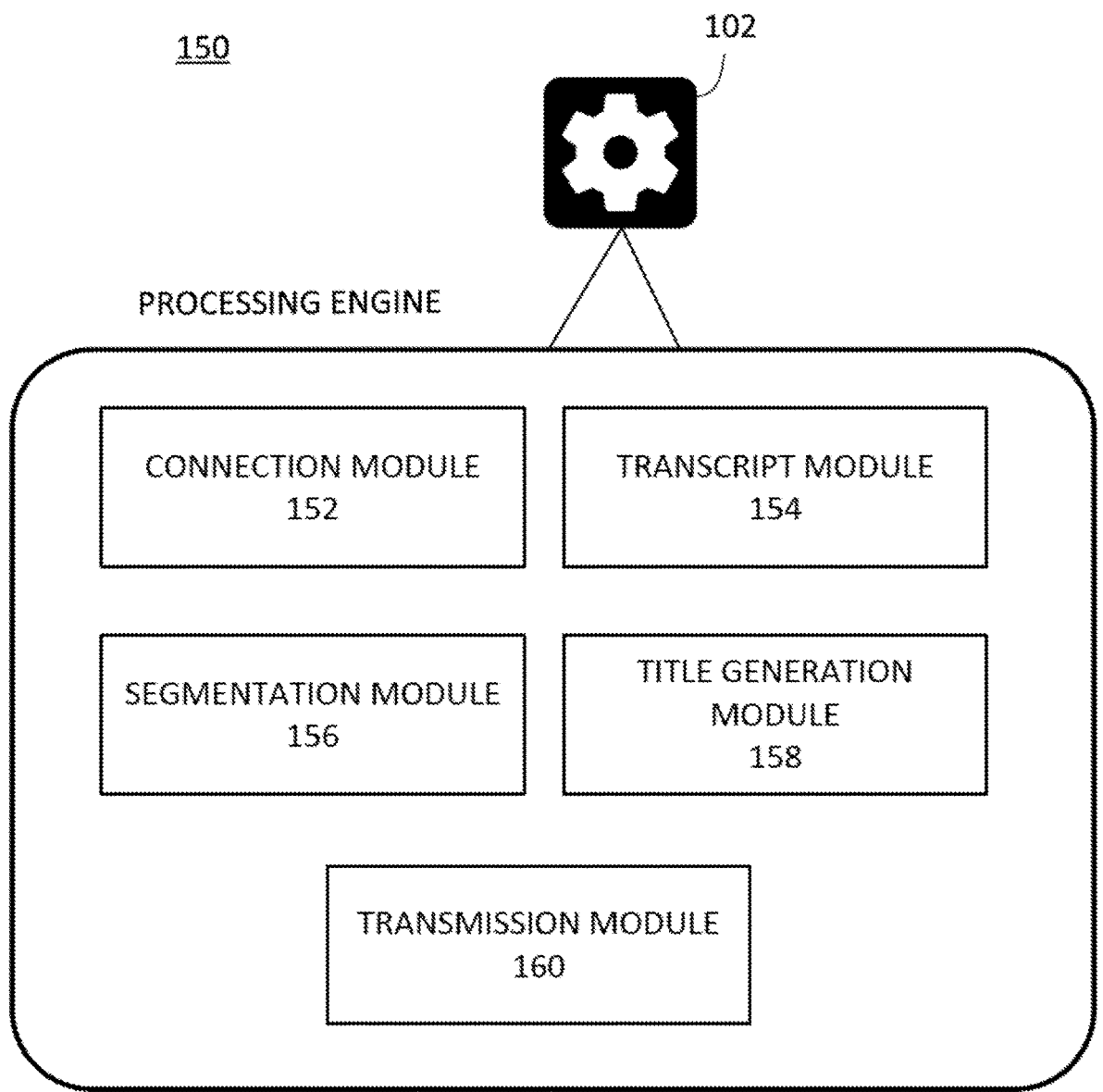
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants.

Transcript module 154 functions to receive a transcript of a conversation between the participants produced during the communication session. The transcript includes timestamps for a number of utterances associated with speaking participants.

Segmentation module 156 functions to segment the utterances into a plurality of contiguous topic segments.

Title generation module 158 functions to generate a title for each topic segment. The title generation process includes at least: labeling one or more of the topic segments based on one or more labeling rules; extracting one or more top phrases from each topic segment; determining a ranking of the top phrases for each topic segment; and generating the title for each topic segment based on the top ranked phrase for the topic segment.

Transmission module 160 functions to transmit, to one or more client devices, a list of the topic segments with generated titles for the communication session.

The above modules and their functions will be described in further detail in relation to an exemplary method below.

Figure 2A:
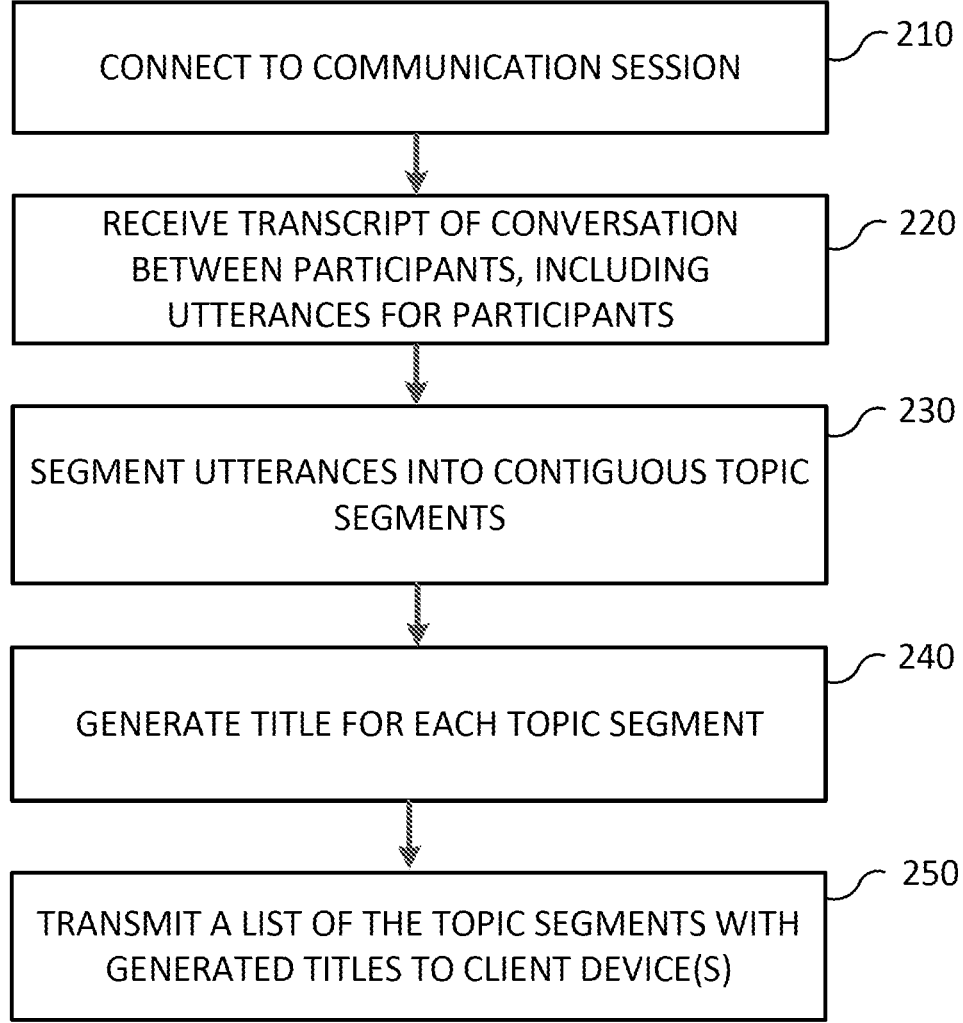
FIG. 2A is a flow chart illustrating an exemplary method that may be performed in some embodiments.

FIG. 2A is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

At step 230, the system segments the utterances into a number of contiguous topic segments. The topic segmentation process is a key component of the system herein, and functions to segment a meeting into contiguous coherent sections. In various embodiments, topic segmentation may involve one or more of the following steps: utterance representation, scoring, and splitting. Each will be described in further detail below.

In some embodiments, the segmentation process includes the system building a representation of the utterances as a number of sentences, each sentence being an input token for the segmentation. In some embodiments, building the representation of the utterances as a number of sentences includes the system representing each utterance with a Universal Sentence Encoder (USE) embedding. Thus, the segmentation operates on sentence representations. By representing each utterance with a USE embedding, the text of the transcript is represented as an N by D matrix, where N is the number of utterances (i.e., the number of initial elements to be grouped into coherent segments) and D is the USE embedding dimension (i.e., the dimensionality of the element representation). For example, when segmenting at the sentence level, N would be the number of sentences in the text, and each sentence might be represented by a D-dimensional vector.

In other embodiments, the segmentation instead operates on word representations rather than sentence representations, with each input token being the embedding of a single word. When segmenting at the word level, N would be the number of words in the text, which each word being represented by a D-dimensional vector.

In some embodiments, there may be one or more preprocessing steps for the segmentation method. For example, a stemming algorithm may be used to remove stop words before forming the representation.

In some embodiments, the segmentation process includes the system identifying a number of candidate segments, each segment representing a cluster of the utterances. In some embodiments, this identification of candidate segments (i.e., clustering of utterances) is performed by employing a scoring function to determine the most appropriate assignment of sentences to clusters or segments.

In some embodiments, the identification of candidate segments is performed by generating a segment score for each candidate segment, then aggregating the segment scores to compute an overall segmentation score. In some embodiments, at least one of the overall segmentation score and the segment scores are used to segment the utterances into the topic segments. Upon building the initial representation of the transcript, the coherence of each segment of text can be specified with a scoring function. The scoring function acts on the vector representation of each sentence and returns a score for the segment. In various embodiments, the segment score may be a simple scalar or more general object. For aggregating the segment scores, a score aggregation function is used. In various embodiments, the score aggregation function may be, for example, a function for adding the scores for the individual segments, or similar general function.

In some embodiments, the segmentation process includes the system splitting the conversation into the topic segments by determining a plurality of contiguous segment boundaries between the segments. In various embodiments, splitting the conversation into the topic segments can be performed with one or more of, e.g., a greedy segmentation method, a dynamic programming based method, and/or an iterative refinement method. In a greedy segmentation method, the system builds up a segmentation into a number of segments by inserting new boundaries at each step to minimize the aggregate score until the desired number of segment boundaries is obtained. In a dynamic programming method, the system splits the segmentation problem into a series of smaller segmentation problems in order to yield the optimal segmentation for the scoring function. In an iterative refinement method, the system attempts to iteratively refine the segmentation, such as by, e.g., attempting to adjust each segment boundary optimally while keeping the edges to either side of the boundary fixed.

In some embodiments, the segmentation process includes identifying an optimal number of segments for the conversation based on a minimum score improvement threshold. In some embodiments, with k as the number of segments, the system iterates k from 1 to the maximum number of segments (for example, 20). For each k, the system determines an overall segmentation score for that number of segments. The score monotonically increases as k increases. The system stops the iteration when the score improvement is less than a threshold, such as, for example 1.5.

In some embodiments, the segmentation process includes determining a minimum number of segments based on a total meeting time and an average segment time. This may prove useful, for example, when the algorithm tends to provide fewer segments than considered optimal for the desired output. In some embodiments, the system sets the minimum number of segments based on meeting total time/average segment time.

At step 240, the system generates a title for each topic segment. In some embodiments, the title is a text string representing the top phrase or most relevant chapter title from the content of the transcript during that segment. In some embodiments, the text string is an arbitrary text string. The titles are generated in a dynamic fashion, rather than being predefined. The title generation process includes at least: labeling one or more of the topic segments based on one or more labeling rules; extracting one or more top phrases from each topic segment; determining a ranking of the top phrases for each topic segment; and generating the title for each topic segment based on the top ranked phrase for the topic segment. The process for generating titles for topic segments will be further described with respect to FIG. 2B.

At step 250, the system transmits, to one or more client devices, a list of the topic segments with their generated titles. In some embodiments, prior to transmitting the list of the topic segments to the client devices, the system formats the list of topic segments into a structured data markup format, such as, e.g., JSON format.

In some embodiments, the communication session is a sales session with one or more prospective customers and one or more members of a sales team. The generated chapter titles relate to the sales session, and the system identifies each of the participants of the communication session as a prospective customer or a member of the sales team.

In some embodiments, the data is displayed at one or more client devices which are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the client devices may be associated with and/or operated by one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on topic segments f they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Figure 4:
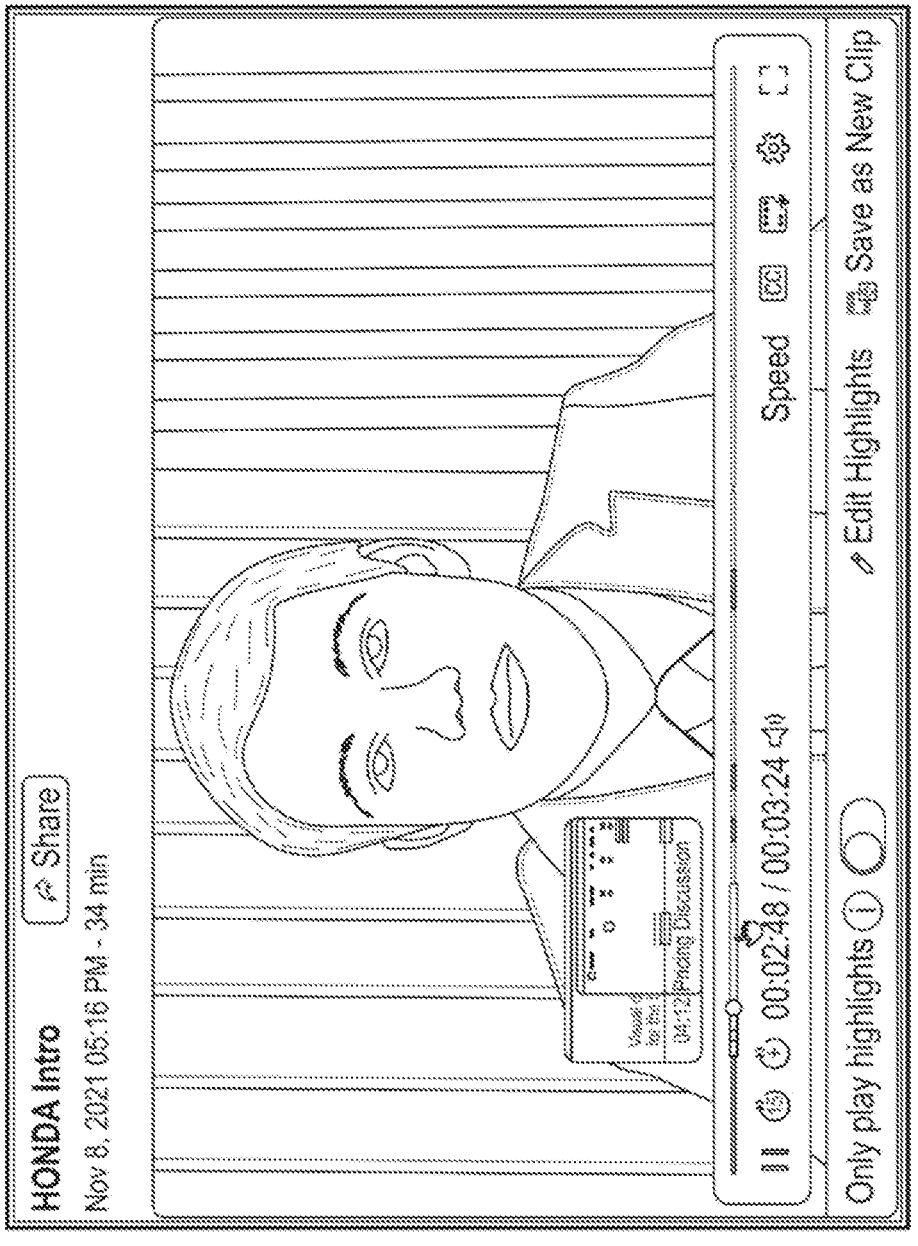
FIG. 4 is a diagram illustrating one example embodiment of a user interface for presenting recorded playback of a communication session separated into different segments.

Within this displayed UI presented to the one or more client devices, data corresponding to the generated titles can be displayed. For example, a UI may be shown which displays aggregate analytics data pertaining to a sales team's meetings with clients over multiple conversations and communication sessions. An example of such a UI displayed to client device(s) is illustrated in FIG. 4 and described in further detail below. In some embodiments, rather than aggregate analytics data or data shown for all team members, individual and/or customized analytics data for a particular participant can be viewed, including potentially a wide variety of data for that particular individual.

Figure 6:
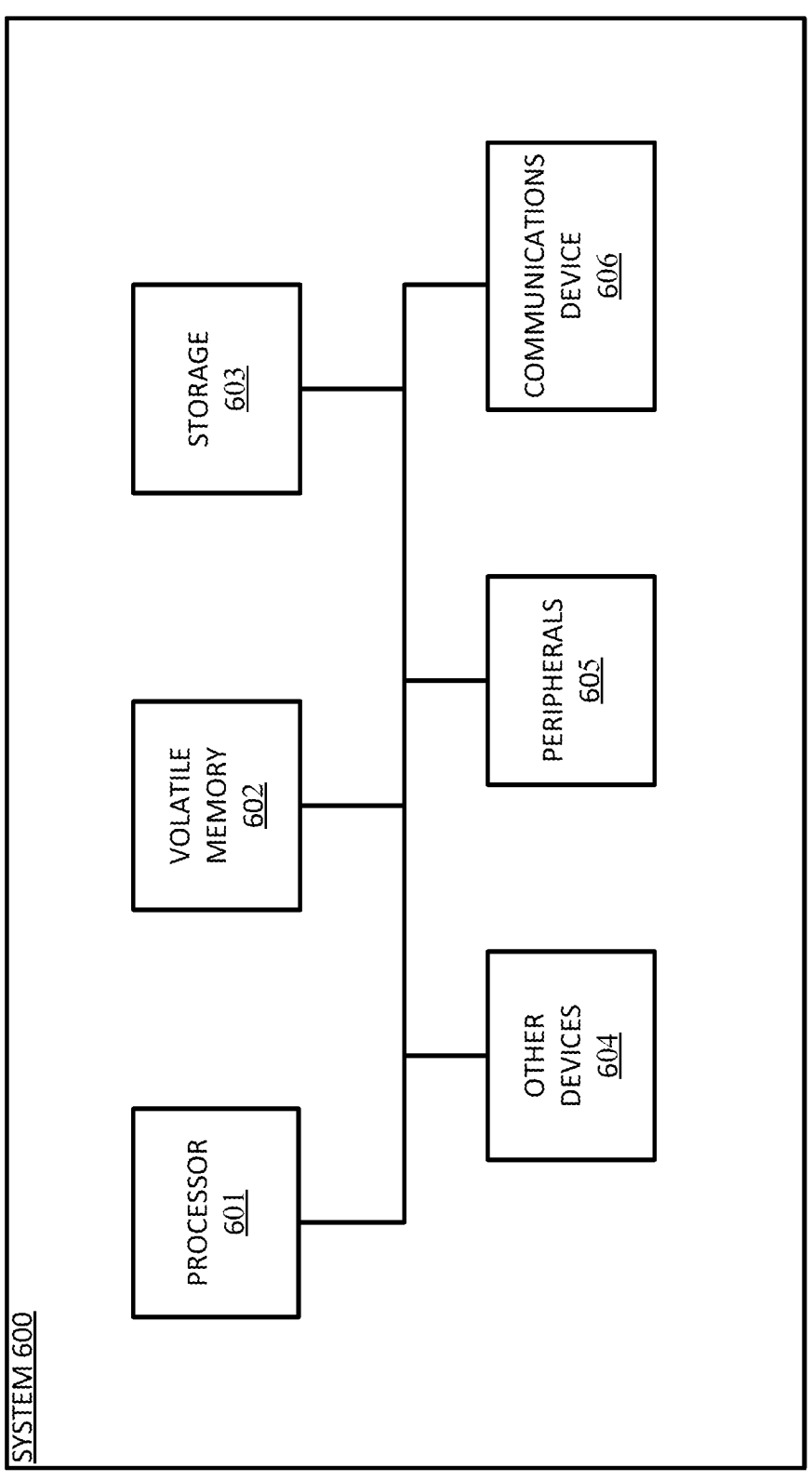
FIG. 6 is a diagram illustrating an exemplary computer that may perform processing in some embodiments.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the topic segments. An example of such a UI is illustrated in FIG. 4, described in further detail below. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 6, described in further detail below.

In some embodiments, the system allows, via one or more authorized client devices, modification of one or more of the start time, end time, and/or title for at least a subset of the topic segments.

Figure 2B:
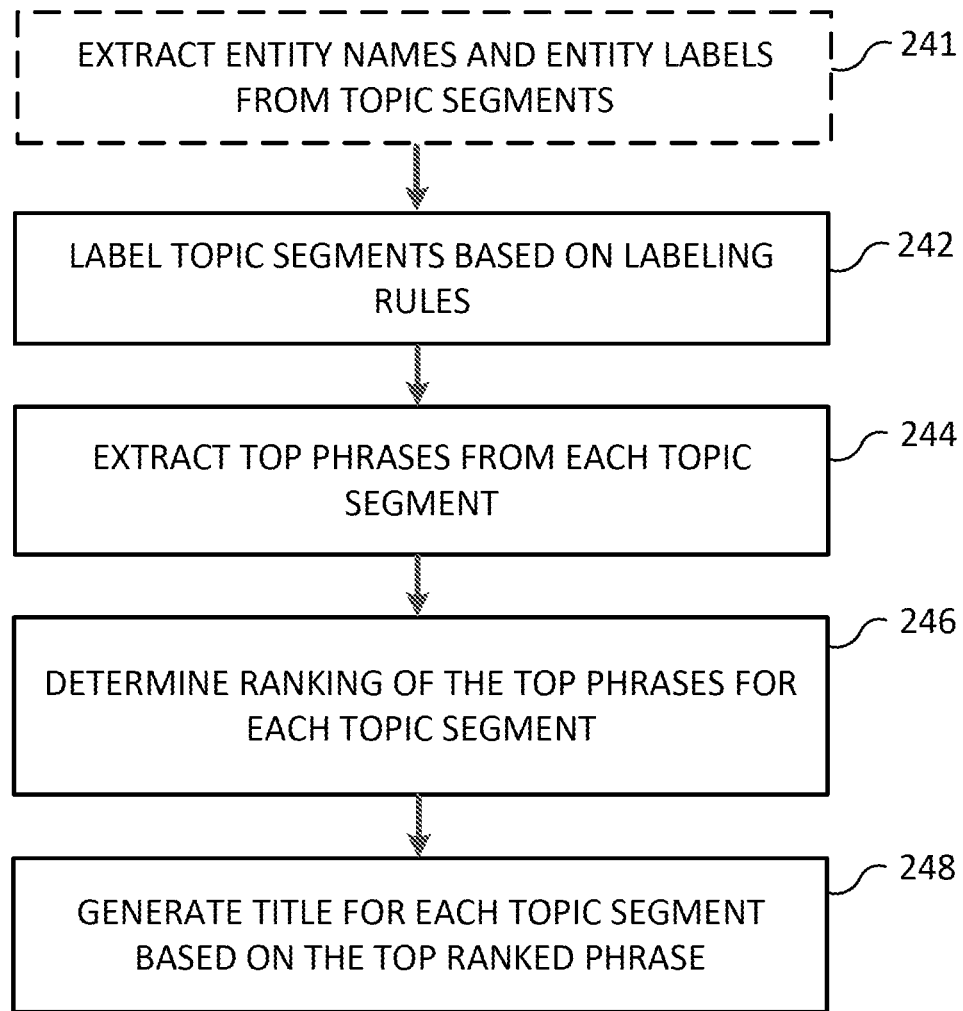
FIG. 2B is a flow chart illustrating an exemplary method for generating a title for each topic segment, in accordance with some embodiments.

FIG. 2B is a flow chart illustrating an exemplary method for generating a title for each topic segment, in accordance with some embodiments. The method relates to various embodiments of step 240 of FIG. 2A.

At optional step 241, in some embodiments, the system performs a preprocessing step of extracting one or more entity names and one or more associated entity labels from the topic segments. The entity labels are used to apply labeling rules, as in step 242. In some embodiments, Named Entity Recognition ("NER") is used to find "named entities". Named entities are entities that can be denoted with a proper name, including, e.g., persons, locations, organizations, and products. NER is a pre-processing step directed to assisting with top phrases ranking, where the phrase which is a named entity will be assigned a higher score.

At step 242, the system labels one or more of the topic segments based on one or more labeling rules. The labeling rules function to assign labels, i.e., titles, to segments based on, for example, the placement of the segment in the overall conversation relative to other segments, or one or more words or phrases of a certain type or content which can be found in the segment. A number of example embodiments of labeling rules are described below.

In some embodiments, one of the labeling rules includes labeling a topic segment as a social exchange if the topic segment is the first segment of the conversation and contains one or more greeting words. For example, if the segment in question is the first segment relative to other segments, and contains such spoken words as "hi", "hello", or "hey", then it may be reasonably inferred by the system that the segment is a social exchange segment and can be labeled as such.

In some embodiments, one of the labeling rules includes labeling a topic segment as an introduction if the topic segment is the first or second segment of the conversation and contains one or more introductory words. For example, if the segment in question is the first or second segment relative to other segments and the segment contains words or phrases such as "my name is" or "we are from", then it may be reasonably inferred by the system that the segment is an introduction and can be labeled as such.

In some embodiments, one of the labeling rules includes labeling a topic segment as an ending if the topic segment is the last segment of the conversation and contains one or more ending words or action verbs. For example, if the segment in question is the last segment relative to other segments and contains words or phrases such as "take care", "nice chatting", "email you", or "send", then it may be reasonably inferred by the system that the segment is an ending and can be labeled as such.

In some embodiments, one of the labeling rules includes, for each topic segment: determining whether each of the top phrases for the topic segment only occurs once in the topic segment and does not overlap with the other top phrases for the topic segment; and if the determination is true for all of the top phrases for the topic segment, labeling the topic segment as other or undetermined. This may be known as a "fallback" rule. The reasoning is such that if each of the top phrases for the segment occurs only once, then they are very likely to be random or incidental terms, rather than terms which are indicative of the topic of the segment. Thus, they can be labeled as other or undetermined.

At step 244, the system extracts one or more top phrases from each topic segment. In some embodiments, extracting the one or more top phrases from each topic segment is performed with a ranking model for text processing, such as, e.g., TextRank or some other suitable similar model. TextRank is a graph-based ranking model for text processing. In some embodiments, such a model is used for unsupervised sentence and/or keyword extraction in order to extract the top phrases from each topic segment.

At step 246, the system determines a ranking of the top phrases for each topic segment. If extracting the top phrases in step 244 involved a ranking of the top phrases, then step 246 involves a reranking or adjustment of that ranking. In some embodiments, the ranking includes determining a score for each of the top phrases, with higher scores earning higher rankings. For example, if the candidate title is an entity, then the system may increase the score of the candidate title, or raise the ranking of the title relative to other titles. As another example, if the candidate title occurs only once in the segment, then the system may lower the score of the title, or lower the ranking of the title relative to other titles.

In various embodiments, determining the ranking for the top phrases is based on one or more of a TextRank keyword score and a Term Frequency-Inverse Document Frequency (TF-IDF) score. That is, in some embodiments, if the candidate title has a higher TextRank keyword score relative to other titles, then it is ranked higher than those other titles. Likewise, in some embodiments, the higher TF-IDF score a candidate title has, the higher it is ranked relative to other titles with lower TF-IDF scores. Such criteria are evaluated at a segment level.

In some embodiments, as a final step prior to generating the title, the above-mentioned "fallback" rule is applied. That is, the system determines whether each of the top phrases for the topic segment only occurs once in the topic segment and does not overlap with the other top phrases for the topic segment; and if the determination is true for all of the top phrases for the topic segment, the system labels the topic segment as other or undetermined.

At step 248, the system generates the title for each topic segment based on the top ranked phrase for the topic segment. The title is thus dynamically generated during the title generation process, rather than being predefined. The number of titles is likewise dynamic rather than fixing, as it relates to a dynamic number of segments determined for the conversation.

Figure 3A:
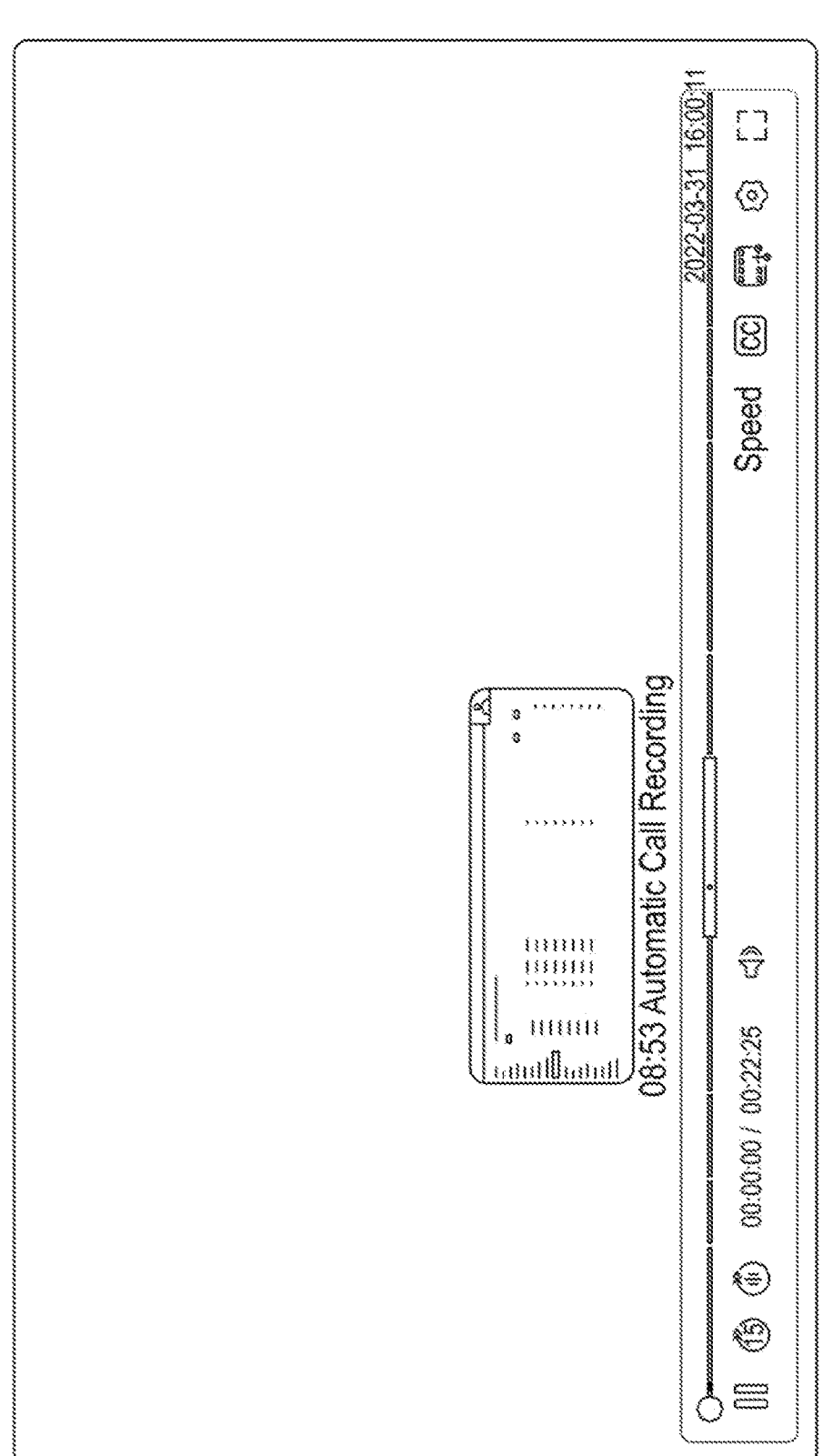
FIG. 3A is a diagram illustrating one example embodiment of a user interface for presenting recorded playback of a communication session separated into different segments.

FIG. 3A is a diagram illustrating one example embodiment of a user interface for presenting recorded playback of a communication session separated into different segments.

In the illustration, recorded playback can be accessed by a user. In some embodiments, the users is a user of the communication platform with access or permission to view the recorded playback of the communication session. The user may also be a host of the meeting, administrator, or other account with access privileges. The title of the meeting is listed ("POC Kickoff"), along with the date, time, and duration of the meeting. At the bottom of the illustration, playback and navigation elements are provided, along with other controls related to the viewing experience. A timeline is provided. The timeline is visually segmented into different sections to represent the different segments of the conversation which were dynamically generated. The user can hover a mouse pointer, for example, to view a preview image of that portion of the video. Along with the preview image, the dynamically generated title for that segment, "Automatic Call Recording", is displayed.

Figure 3B:
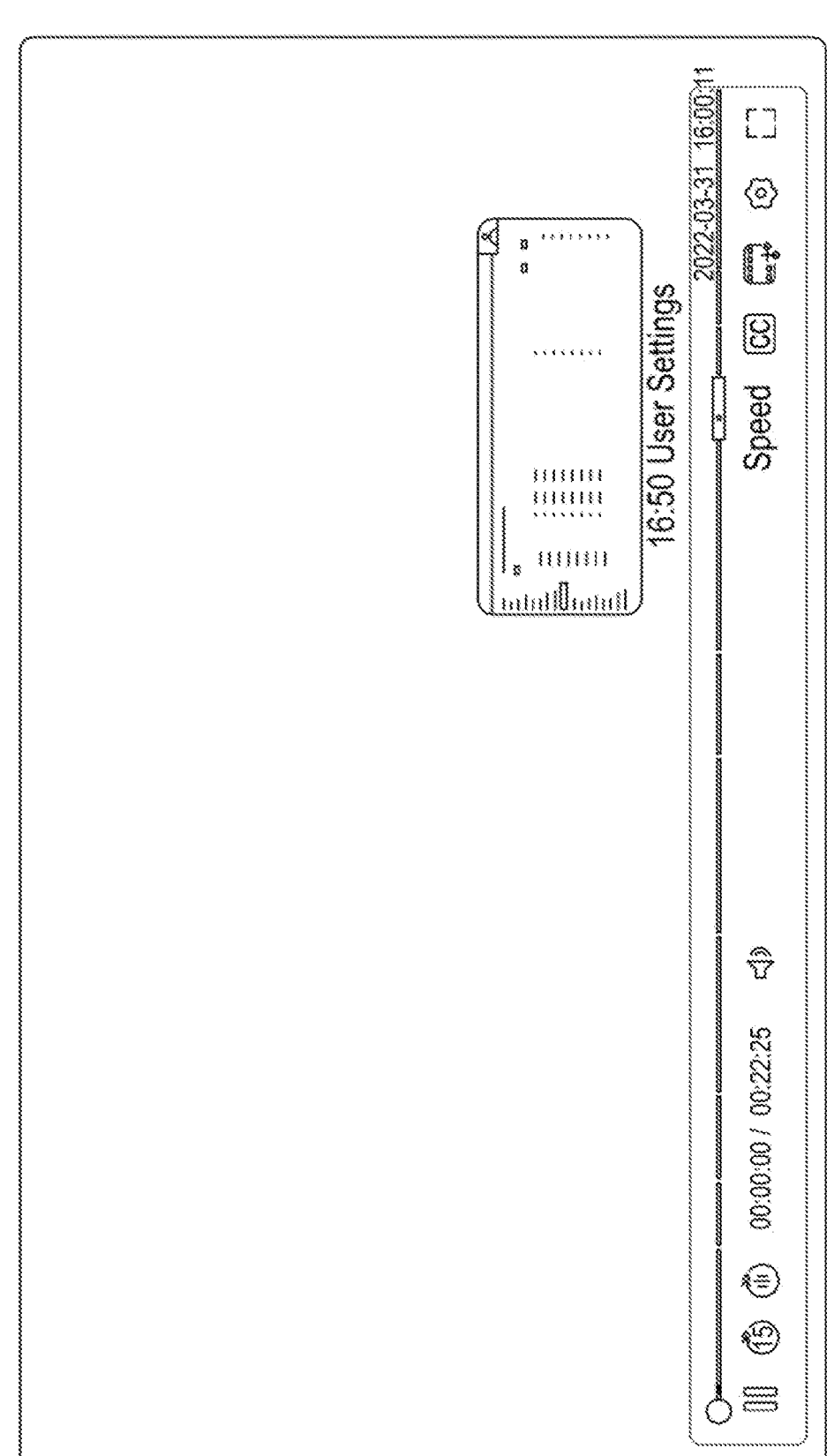
FIG. 3B is a diagram illustrating one example embodiment of a user interface for presenting recorded playback of a communication session separated into different segments.

FIG. 3B is a diagram illustrating one example embodiment of a user interface for presenting recorded playback of a communication session separated into different segments.

The illustration provides the same user interface and same video example as in FIG. 3A. The user has navigated within the timeline to a preview of a different section of the video, which is demarcated as a separate, later segment than the segment shown in FIG. 3A. The dynamically generated title for this segment is "User Settings".

FIG. 4 is a diagram illustrating one example embodiment of a user interface for presenting recorded playback of a communication session separated into different segments.

Within the illustrated UI, information about a specific recording of a communication session is displayed, including a video of the recording itself which can be played back in various ways or adjusted to skip to different times or segments within the video. A timeline allows the user to skip to a different segment, and when the user hovers over a topic, a timestamp as well as a dynamically generated title for the segment is displayed.

The segments and title which are shown within this UI and which can be skipped to were dynamically generated according to the systems and methods described herein, such as, e.g., FIG. 2A, FIG. 2B, and their accompanying descriptions.

Figure 5:
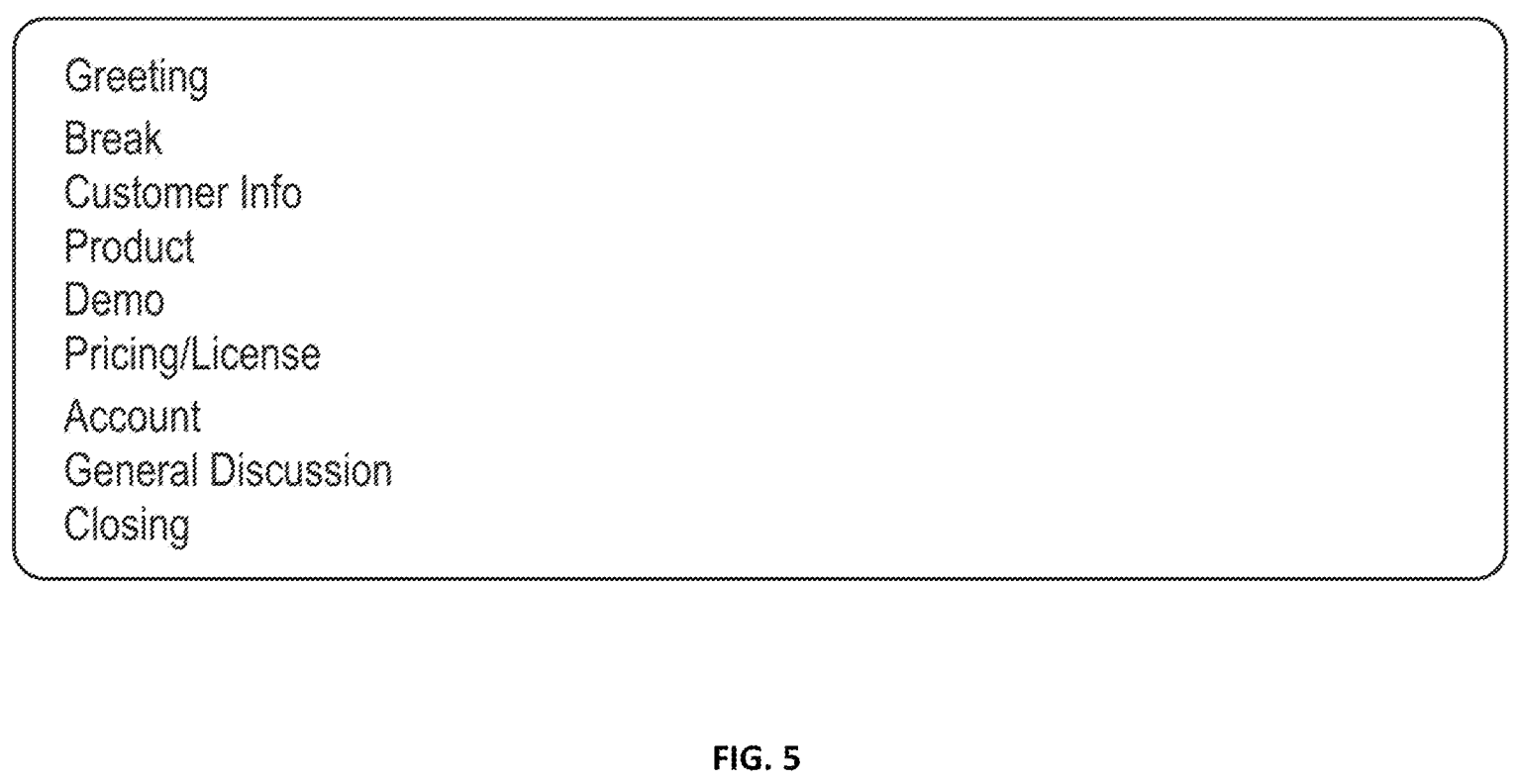

FIG. 5 is a diagram illustrating examples of labels for topic segments.

In the example, such labels include "Greeting", "Break", "Customer Info", "Product", "Demo", "Pricing/License", "Account", "General Discussion", and "Closing". In some embodiments, these labels are dynamically generated via the steps described above with respect to FIG. 2A, FIG. 2B, and their accompanying descriptions.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

It will be appreciated that the present disclosure may include any one and up to all of the following examples.

Example 1. A method comprising: connecting to a communication session with a plurality of participants; receiving a transcript of a conversation between the participants produced during the communication session, the transcript comprising timestamps for a plurality of utterances associated with speaking participants; segmenting the utterances into a plurality of contiguous topic segments; generating a title for each topic segment, the generating comprising: labeling one or more of the topic segments based on one or more labeling rules, extracting one or more top phrases from each topic segment, determining a ranking of the top phrases for each topic segment, and generating the title for each topic segment based on the top ranked phrase for the topic segment; and transmitting, to one or more client devices, a list of the topic segments with generated titles for the communication session.

Example 2. The method of example 1, wherein generating the title for each topic segment further comprises preprocessing by extracting one or more entity names and one or more entity labels from the topic segments.

Example 3. The method of any of example 1 or example 2, wherein segmenting the utterances into the plurality of topic segments comprises building a representation of the utterances as a plurality of sentences, each sentence being an input token for the segmentation.

Example 4. The method of example 3, wherein building the representation of the utterances as the plurality of sentences comprises representing each utterance with a Universal Sentence Encoder (USE) embedding.

Example 5. The method of any of examples 1-4, wherein segmenting the utterances into the plurality of topic segments comprises identifying a plurality of candidate segments, each segment representing a cluster of the utterances.

Example 6. The method of example 5, wherein segmenting the utterances into the plurality of topic segments further comprises: generating a segment score for each candidate segment, and aggregating the segment scores to compute an overall segmentation score, wherein at least one of the overall segmentation score and the segment scores are used to segment the utterances into the plurality of topic segments.

Example 7. The method of any of examples 1-6, wherein segmenting the utterances into the plurality of topic segments comprises: splitting the conversation into the topic segments by determining a plurality of contiguous segment boundaries between the segments.

Example 8. The method of example 7, wherein splitting the conversation into the topic segments is performed with one or more of: a greedy segmentation method, a dynamic programming based method, and an iterative refinement method.

Example 9. The method of any of examples 1-8, wherein one of the labeling rules comprises labeling a topic segment as a social exchange if the topic segment is the first segment of the conversation and contains one or more greeting words.

Example 10. The method of any of examples 1-9, wherein one of the labeling rules comprises labeling a topic segment as an introduction if the topic segment is the first or second segment of the conversation and contains one or more introductory words.

Example 11. The method of any of examples 1-10, wherein one of the labeling rules comprises labeling a topic segment as an ending if the topic segment is the last segment of the conversation and contains one or more ending words or action verbs.

Example 12. The method of any of examples 1-11, wherein extracting the one or more top phrases from each topic segment is performed with a TextRank method.

Example 13. The method of any of examples 1-12, wherein determining the score for each of the top phrases is based on one or more of a TextRank keyword score and a Term Frequency-Inverse Document Frequency (TF-IDF) score.

Example 14. The method of any of examples 1-13, wherein determining the score for each of the top phrases comprises determining whether each of the top phrases is an entity.

Example 15. The method of any of examples 1-14, wherein determining the score for each of the top phrases comprises determining whether each of the top phrases only occurs once in the topic segment it appears in.

Example 16. The method of any of examples 1-15, wherein one of the labeling rules comprises: for each topic segment: determining whether each of the top phrases for the topic segment only occurs once in the topic segment and does not overlap with the other top phrases for the topic segment; and if the determination is true for all of the top phrases for the topic segment, labeling the topic segment as other or undetermined.

Example 17. The method of any of examples 1-16, wherein segmenting the utterances into a plurality of contiguous topic segments comprises: identifying an optimal number of segments for the conversation based on a minimum score improvement threshold.

Example 18. The method of any of examples 1-17, wherein segmenting the utterances into a plurality of contiguous topic segments comprises: determining a minimum number of segments based on a total meeting time and an average segment time.

Example 19. A communication system comprising one or more processors configured to perform the operations of: connecting to a communication session with a plurality of participants; receiving a transcript of a conversation between the participants produced during the communication session, the transcript comprising timestamps for a plurality of utterances associated with speaking participants; segmenting the utterances into a plurality of contiguous topic segments; generating a title for each topic segment, the generating comprising: labeling one or more of the topic segments based on one or more labeling rules, extracting one or more top phrases from each topic segment, determining a ranking of the top phrases for each topic segment, and generating the title for each topic segment based on the top ranked phrase for the topic segment; and transmitting, to one or more client devices, a list of the topic segments with generated titles for the communication session.

Example 20. The communication system of example 19, wherein one of the labeling rules comprises: for each topic segment: determining whether each of the top phrases for the topic segment only occurs once in the topic segment and does not overlap with the other top phrases for the topic segment; and if the determination is true for all of the top phrases for the topic segment, labeling the topic segment as other or undetermined.

Example 21. The communication system of any of example 19 or example 20, wherein segmenting the utterances into a plurality of contiguous topic segments comprises: identifying an optimal number of segments for the conversation based on a minimum score improvement threshold.

Example 22. The communication system of any of examples 19-21, wherein segmenting the utterances into a plurality of contiguous topic segments comprises:
determining a minimum number of segments based on a total meeting time and an average segment time.

Example 23. The communication system of any of examples 19-22, wherein generating the title for each topic segment further comprises preprocessing by extracting one or more entity names and one or more entity labels from the topic segments.

Example 24. The communication system of any of examples 19-23, wherein segmenting the utterances into the plurality of topic segments comprises building a representation of the utterances as a plurality of sentences, each sentence being an input token for the segmentation.

Example 25. The communication system of example 24, wherein building the representation of the utterances as the plurality of sentences comprises representing each utterance with a Universal Sentence Encoder (USE) embedding.

Example 26. The communication system of any of examples 19-25, wherein segmenting the utterances into the plurality of topic segments comprises identifying a plurality of candidate segments, each segment representing a cluster of the utterances.

Example 27. The communication system of example 26, wherein segmenting the utterances into the plurality of topic segments further comprises:

generating a segment score for each candidate segment, and aggregating the segment scores to compute an overall segmentation score, wherein at least one of the overall segmentation score and the segment scores are used to segment the utterances into the plurality of topic segments.

Example 28. The communication system of any of examples 19-21, wherein segmenting the utterances into the plurality of topic segments comprises:

splitting the conversation into the topic segments by determining a plurality of contiguous segment boundaries between the segments.

Example 29. The communication system of example 28, wherein splitting the conversation into the topic segments is performed with one or more of: a greedy segmentation method, a dynamic programming based method, and an iterative refinement method.

Example 30. The communication system of any of examples 19-29, wherein one of the labeling rules comprises labeling a topic segment as a social exchange if the topic segment is the first segment of the conversation and contains one or more greeting words.

Example 31. The communication system of any of examples 19-30, wherein one of the labeling rules comprises labeling a topic segment as an introduction if the topic segment is the first or second segment of the conversation and contains one or more introductory words.

Example 32. The communication system of any of examples 19-31, wherein one of the labeling rules comprises labeling a topic segment as an ending if the topic segment is the last segment of the conversation and contains one or more ending words or action verbs.

Example 33. The communication system of any of examples 19-32, wherein extracting the one or more top phrases from each topic segment is performed with a TextRank method.

Example 34. The communication system of any of examples 19-33, wherein determining the score for each of the top phrases is based on one or more of a TextRank keyword score and a Term Frequency-Inverse Document Frequency (TF-IDF) score.

Example 35. The communication system of any of examples 19-34, wherein determining the score for each of the top phrases comprises determining whether each of the top phrases is an entity.

Example 36. The communication system of any of examples 19-35, wherein determining the score for each of the top phrases comprises determining whether each of the top phrases only occurs once in the topic segment it appears in.

Example 37. The communication system of any of examples 19-36, wherein one of the labeling rules comprises: for each topic segment: determining whether each of the top phrases for the topic segment only occurs once in the topic segment and does not overlap with the other top phrases for the topic segment; and if the determination is true for all of the top phrases for the topic segment, labeling the topic segment as other or undetermined.

Example 38. The communication system of any of examples 19-37, wherein segmenting the utterances into a plurality of contiguous topic segments comprises: identifying an optimal number of segments for the conversation based on a minimum score improvement threshold.

Example 39. The communication system of any of examples 19-38, wherein segmenting the utterances into a plurality of contiguous topic segments comprises: determining a minimum number of segments based on a total meeting time and an average segment time.

Example 40. A non-transitory computer-readable medium containing instructions for generating a note with session content from a communication session, comprising: instructions for connecting to a communication session with a plurality of participants; instructions for receiving a transcript of a conversation between the participants produced during the communication session, the transcript comprising timestamps for a plurality of utterances associated with speaking participants; instructions for segmenting the utterances into a plurality of contiguous topic segments; instructions for generating a title for each topic segment, the generating comprising: labeling one or more of the topic segments based on one or more labeling rules, extracting one or more top phrases from each topic segment, determining a ranking of the top phrases for each topic segment, and generating the title for each topic segment based on the top ranked phrase for the topic segment; and instructions for transmitting, to one or more client devices, a list of the topic segments with generated titles for the communication session.

Example 41. The non-transitory computer-readable medium of example 40, wherein generating the title for each topic segment further comprises preprocessing by extracting one or more entity names and one or more entity labels from the topic segments.

Example 42. The non-transitory computer-readable medium of any of example 40 or example 41, wherein segmenting the utterances into the plurality of topic segments comprises building a representation of the utterances as a plurality of sentences, each sentence being an input token for the segmentation.

Example 43. The non-transitory computer-readable medium of example 42, wherein building the representation of the utterances as the plurality of sentences comprises representing each utterance with a Universal Sentence Encoder (USE) embedding.

Example 44. The non-transitory computer-readable medium of any of examples 40-43, wherein segmenting the utterances into the plurality of topic segments comprises identifying a plurality of candidate segments, each segment representing a cluster of the utterances.

Example 45. The non-transitory computer-readable medium of example 44, wherein segmenting the utterances into the plurality of topic segments further comprises: generating a segment score for each candidate segment, and aggregating the segment scores to compute an overall segmentation score, wherein at least one of the overall segmentation score and the segment scores are used to segment the utterances into the plurality of topic segments.

Example 46. The non-transitory computer-readable medium of any of examples 40-45, wherein segmenting the utterances into the plurality of topic segments comprises: splitting the conversation into the topic segments by determining a plurality of contiguous segment boundaries between the segments.

Example 47. The non-transitory computer-readable medium of example 46, wherein splitting the conversation into the topic segments is performed with one or more of: a greedy segmentation method, a dynamic programming based method, and an iterative refinement method.

Example 48. The non-transitory computer-readable medium of any of examples 40-47, wherein one of the labeling rules comprises labeling a topic segment as a social exchange if the topic segment is the first segment of the conversation and contains one or more greeting words.

Example 49. The non-transitory computer-readable medium of any of examples 40-48, wherein one of the labeling rules comprises labeling a topic segment as an introduction if the topic segment is the first or second segment of the conversation and contains one or more introductory words.

Example 50. The non-transitory computer-readable medium of any of examples 40-49, wherein one of the labeling rules comprises labeling a topic segment as an ending if the topic segment is the last segment of the conversation and contains one or more ending words or action verbs.

Example 51. The non-transitory computer-readable medium of any of examples 40-50, wherein extracting the one or more top phrases from each topic segment is performed with a TextRank method.

Example 52. The non-transitory computer-readable medium of any of examples 40-51, wherein determining the score for each of the top phrases is based on one or more of a TextRank keyword score and a Term Frequency-Inverse Document Frequency (TF-IDF) score.

Example 53. The non-transitory computer-readable medium of any of examples 40-52, wherein determining the score for each of the top phrases comprises determining whether each of the top phrases is an entity.

Example 54. The non-transitory computer-readable medium of any of examples 40-53, wherein determining the score for each of the top phrases comprises determining whether each of the top phrases only occurs once in the topic segment it appears in.

Example 55. The non-transitory computer-readable medium of any of examples 40-54, wherein one of the labeling rules comprises: for each topic segment: determining whether each of the top phrases for the topic segment only occurs once in the topic segment and does not overlap with the other top phrases for the topic segment; and if the determination is true for all of the top phrases for the topic segment, labeling the topic segment as other or undetermined.

Example 56. The non-transitory computer-readable medium of any of examples 40-55, wherein segmenting the utterances into a plurality of contiguous topic segments comprises: identifying an optimal number of segments for the conversation based on a minimum score improvement threshold.

Example 57. The non-transitory computer-readable medium of any of examples 40-56, wherein segmenting the utterances into a plurality of contiguous topic segments comprises: determining a minimum number of segments based on a total meeting time and an average segment time.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
connecting to a communication session with a plurality of participants;
receiving a transcript of a conversation between the participants produced during the communication session, the transcript comprising timestamps for a plurality of utterances associated with speaking participants;
segmenting the utterances into a plurality of contiguous topic segments, comprising:
identifying a plurality of candidate segments, each segment representing a cluster of the utterances,
generating a segment score for each candidate segment, and
aggregating the segment scores to compute an overall segmentation score, wherein the overall segmentation score and the segmentation scores are used to segment the utterances into the plurality of contiguous topic segments;
generating a title for each topic segment, the generating comprising:
labeling one or more of the topic segments based on a placement of the one or more topic segments in the conversation relative to other topic segments,
extracting one or more top phrases from each topic segment,
determining a ranking of the top phrases for each topic segment, and
selecting a title based on phrase ranking and the placement of the one or more topic segments in the conversation relative to other topic segments; and
transmitting, to one or more client devices, a list of the topic segments with generated titles for the communication session.

2. The method of claim 1, wherein segmenting the utterances into the plurality of contiguous topic segments comprises building a representation of the utterances as a plurality of sentences, each sentence being an input token for the segmentation.

3. The method of claim 2, wherein building the representation of the utterances as the plurality of sentences comprises representing each utterance with a Universal Sentence Encoder (USE) embedding.

4. The method of claim 1, wherein segmenting the utterances into the plurality of contiguous topic segments comprises:
splitting the conversation into topic segments by determining a plurality of contiguous segment boundaries between the segments.

5. The method of claim 4, wherein splitting the conversation into the topic segments is performed with one or more of a greedy segmentation method, a dynamic programming based method, and an iterative refinement method.

6. The method of claim 1, wherein generating the title for each topic segment further comprises preprocessing by extracting one or more entity names and one or more entity labels from the topic segments.

7. The method of claim 1, wherein segmenting the utterances into the plurality of contiguous topic segments comprises identifying an optimal number of segments for the conversation based on a minimum score improvement threshold.

8. The method of claim 1, wherein segmenting the utterances into the plurality of contiguous topic segments comprises:
determining a minimum number of segments based on a total meeting time and an average segment time.

9. The method of claim 1, wherein labeling the one or more of the topic segments comprises labeling a topic segment as a social exchange if the topic segment is a first segment of the conversation and contains one or more greeting words.

10. The method of claim 1, wherein labeling the one or more of the topic segments comprises labeling a topic segment as an introduction if the topic segment is a first or second segment of the conversation and contains one or more introductory words.

11. The method of claim 1, wherein labeling the one or more of the topic segments comprises labeling a topic segment as an ending if the topic segment is a last segment of the conversation and contains one or more ending words or action verbs.

12. The method of claim 1, wherein extracting the one or more top phrases from each topic segment is performed with a TextRank method.

13. The method of claim 1, wherein determining the ranking for each of the top phrases is based on one or more of a TextRank keyword score and a Term Frequency-Inverse Document Frequency (TF-IDF) score.

14. The method of claim 1, wherein determining the ranking for each of the top phrases comprises determining whether each of the top phrases is an entity.

15. The method of claim 1, wherein determining the ranking for each of the top phrases comprises determining whether each of the top phrases only occurs once in the topic segment it appears in.

16. A communication system comprising one or more processors configured to perform operations of:
  connecting to a communication session with a plurality of participants;
  receiving a transcript of a conversation between the participants produced during the communication session, the transcript comprising timestamps for a plurality of utterances associated with speaking participants;
  segmenting the utterances into a plurality of contiguous topic segments, comprising:
    identifying a plurality of candidate segments, each segment representing a cluster of the utterances,
    generating a segment score for each candidate segment, and
    aggregating the segment scores to compute an overall segmentation score, wherein the overall segmentation score and the segmentation scores are used to segment the utterances into the plurality of contiguous topic segments;
  generating a title for each topic segment, the generating comprising:
    labeling one or more of the topic segments based on a placement of the one or more topic segments in the conversation relative to other topic segments,
    extracting one or more top phrases from each topic segment,
    determining a ranking of the top phrases for each topic segment, and
    selecting a title based on phrase ranking and the placement of the one or more topic segments in the conversation relative to other topic segments; and
  transmitting, to one or more client devices, a list of the topic segments with generated titles for the communication session.

17. The communication system of claim 16, wherein labeling the one or more of the topic segments comprises:

for each topic segment:
  determining whether each of the top phrases for the topic segment only occurs once in the topic segment and does not overlap with other top phrases for the topic segment; and
  if the determination is true for all of the top phrases for the topic segment, labeling the topic segment as other or undetermined.

18. The communication system of claim 16, wherein segmenting the utterances into a plurality of contiguous topic segments comprises:
  identifying an optimal number of segments for the conversation based on a minimum score improvement threshold.

19. The communication system of claim 16, wherein segmenting the utterances into a plurality of contiguous topic segments comprises:
  determining a minimum number of segments based on a total meeting time and an average segment time.

20. A non-transitory computer-readable medium containing instructions that when executed by a processor, cause the processor to perform operations comprising:
  connecting to a communication session with a plurality of participants;
  receiving a transcript of a conversation between the participants produced during the communication session, the transcript comprising timestamps for a plurality of utterances associated with speaking participants;
  segmenting the utterances into a plurality of contiguous topic segments, comprising:
    identifying a plurality of candidate segments, each segment representing a cluster of the utterances,
    generating a segment score for each candidate segment, and
    aggregating the segment scores to compute an overall segmentation score, wherein the overall segmentation score and the segmentation scores are used to segment the utterances into the plurality of contiguous topic segments;
  generating a title for each topic segment, the generating comprising:
    labeling one or more of the topic segments based on a placement of the one or more topic segments in the conversation relative to other topic segments,
    extracting one or more top phrases from each topic segment,
    determining a ranking of the top phrases for each topic segment, and
    selecting a title based on phrase ranking and the placement of the one or more topic segments in the conversation relative to other topic segments; and
  transmitting, to one or more client devices, a list of the topic segments with generated titles for the communication session.

\* \* \* \* \*